(12) United States Patent
Kim

(10) Patent No.: US 10,001,189 B2
(45) Date of Patent: Jun. 19, 2018

(54) SHOCK ABSORBER

(71) Applicant: MANDO CORPORATION, Pyeongtaek-si, Gyeonggi-do (KR)

(72) Inventor: Eun Joong Kim, Yongin-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 0 days. days.

(21) Appl. No.: 15/258,850

(22) Filed: Sep. 7, 2016

(65) Prior Publication Data

US 2017/0082169 A1 Mar. 23, 2017

(30) Foreign Application Priority Data

Sep. 17, 2015 (KR) ........................ 10-2015-0131623

(51) Int. Cl.
*F16F 9/348* (2006.01)
*F16F 9/19* (2006.01)
*F16F 9/50* (2006.01)

(52) U.S. Cl.
CPC ................ *F16F 9/348* (2013.01); *F16F 9/19* (2013.01); *F16F 9/3488* (2013.01); *F16F 9/50* (2013.01); *F16F 2228/066* (2013.01)

(58) Field of Classification Search
CPC .. F16F 9/348; F16F 9/19; F16F 9/3488; F16F 9/50
See application file for complete search history.

(56) References Cited

U.S. PATENT DOCUMENTS

| 6,860,370 B2 * | 3/2005 | Nakadate | F16F 9/3485 188/282.5 |
| 2015/0362038 A1 * | 12/2015 | Kim | F16F 9/3488 188/280 |

FOREIGN PATENT DOCUMENTS

| KR | 10-1995-0033174 A | 12/1995 |
| KR | 10-0333435 B1 | 4/2002 |
| KR | 10-0451289 B1 | 10/2004 |
| KR | 10-2012-0021258 A | 3/2012 |
| KR | 10-2012-0075422 A | 7/2012 |
| KR | 10-1239924 B1 | 3/2013 |

* cited by examiner

*Primary Examiner* — Vishal R Sahni
(74) *Attorney, Agent, or Firm* — McDermott Will & Emery LLP

(57) ABSTRACT

Provided is a shock absorber capable of suppressing a great change in a damping force even upon a stroke change. The shock absorber with a pilot chamber includes: a housing that constitutes the pilot chamber and includes a pilot hole and an inflow passage; a disk valve body that allows a fluid inside the pilot chamber to be discharged outside via the pilot hole; and a check valve body that allows the fluid to flow into the pilot chamber through the inflow passage.

11 Claims, 5 Drawing Sheets

(Prior Art)

SHOCK ABSORBER

CROSS-REFERENCE(S) TO RELATED APPLICATION

This application claims the benefit of Korean Patent Application No. 10-2015-0131623, filed on Sep. 17, 2015, in the Korean Intellectual Property Office, the disclosure of which is incorporated herein in its entirety by reference.

BACKGROUND OF THE INVENTION

Field of the Invention

The present invention relates to a shock absorber, and more particularly, to a shock absorber capable of preventing an abrupt variation in a damping force upon stroke change.

Description of the Related Art

In general, a shock absorber is used to improve ride comfort and stability of a vehicle by reducing or attenuating shock or vibration transferred from a road surface during driving, or rolling, noise-down or noise-up phenomena generated due to maneuvers of the vehicle, such as cornering, acceleration, or braking. Also, in recent years, many researches have been done on damping force variable shock absorbers to further improve ride comfort or stability by changing a damping force according to a road condition, a driving condition, and the like.

As disclosed in Korean Patent Application Publication No. 10-2012-0021258, a damping force variable shock absorber forms a pilot chamber on a rear surface of a disk valve body serving as a damping force generation mechanism, and a change in a pressure of the pilot chamber causes a change in an opening pressure of the disk valve body. However, when the stroke change of a piston rod occurs, the damping force changes abruptly.

PRIOR ART DOCUMENT(S)

Patent Document

Korean Patent Application Publication No. 10-1995-033174 (Dec. 22, 1995)
Korean Patent Registration No. 10-0451289 (Sep. 22, 2004)
Korean Patent Registration No. 10-1239924 (Feb. 27, 2013)
Korean Patent Application Publication No. 10-2012-0021258 (Mar. 8, 2012)
Korean Patent Application Publication No. 10-2012-0075422 (Jul. 6, 2012)
Korean Patent Registration No. 10-0333435 (Apr. 9, 2002)

SUMMARY OF THE INVENTION

The present invention is directed to provide a shock absorber capable of suppressing a great change in a damping force even upon a stroke change of a piston rod of the shock absorber.

According to an embodiment of the present invention, a shock absorber with a pilot chamber includes: a housing that constitutes the pilot chamber and includes a pilot hole and an inflow passage; a disk valve body that allows a fluid inside the pilot chamber to be discharged outside via the pilot hole; and a check valve body that allows the fluid to flow into the pilot chamber through the inflow passage.

The inflow passage may be an inflow hole formed in a bottom portion of the housing.

The check valve body may include: a valve main body disposed in the housing to cover the inflow passage; a valve holding portion connected to the housing so as to hold a position of the check valve body; and a connection portion that connects the valve main body to the valve holding portion.

The housing may include a bottom portion and a holding member, and the valve holding portion of the check valve body may be disposed between the bottom portion and the holding member.

A cutout portion formed between the valve main body and valve holding portion of the check valve body may be formed to correspond to the pilot hole.

The shock absorber may further include: a spool guide inserted into an insertion hole of the housing; a spool configured to be slidable in the spool guide; and a solenoid configured to apply a force so as to move the spool, wherein the spool guide has a first passage that communicates with at least one of the pilot chamber and a main passage for supplying a fluid to the pilot chamber.

When the spool opens the first passage of the spool guide, a part of a fluid flowing through the main passage may flow into the spool guide through the first passage and may be discharged outside from the spool guide through a second passage formed in the spool guide.

DETAILED DESCRIPTION OF EMBODIMENTS

Figure 1:
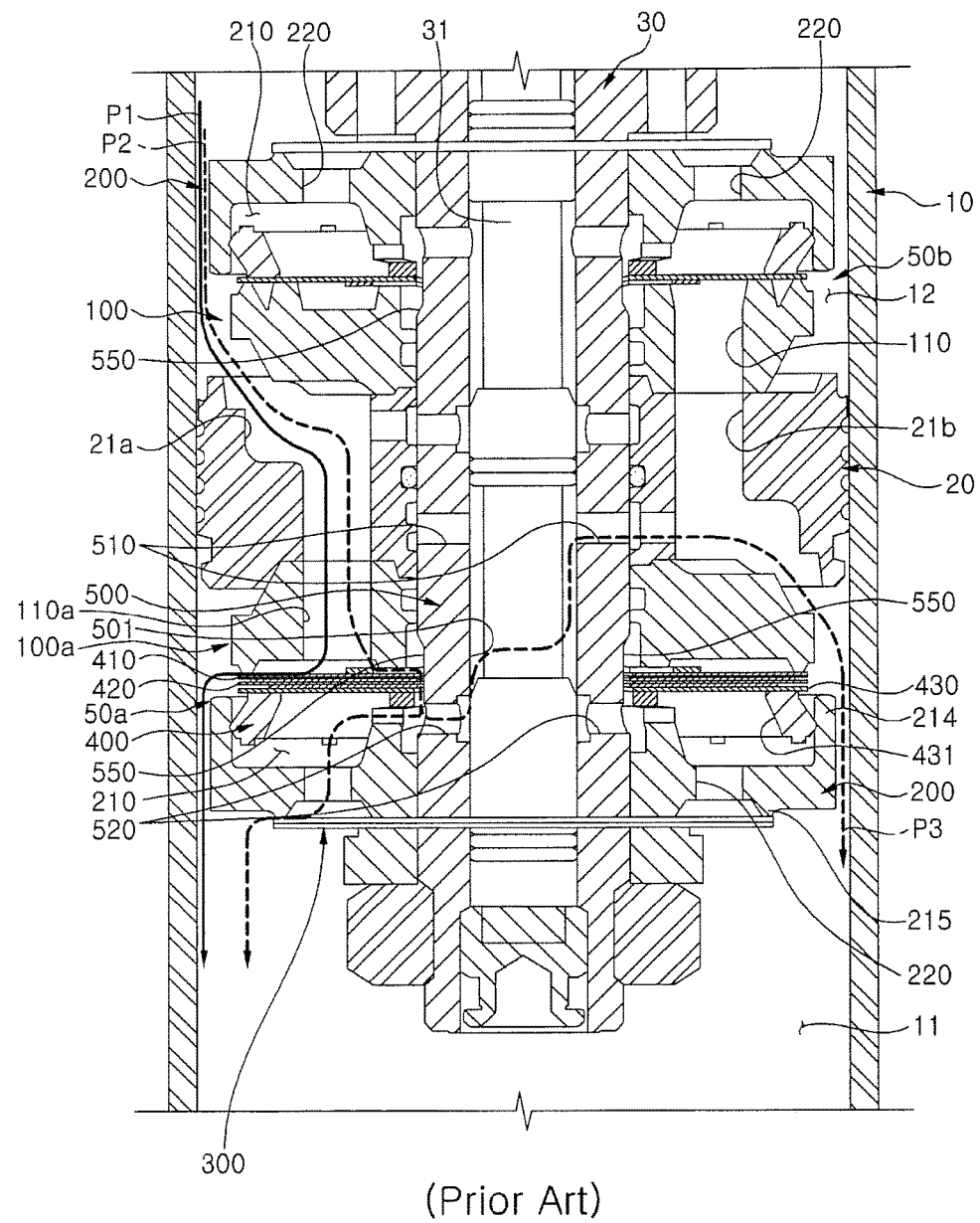
FIG. 1 is a partial sectional view of a conventional damping force variable shock absorber.

Hereinafter, embodiments of the present invention will be described in detail, by way of an example, with reference to the accompanying drawings.

First, a configuration of a damping force variable shock absorber will be described with reference to a conventional damping force variable shock absorber illustrated in FIGS. 1 and 2. The damping force variable shock absorber includes a piston 20, and a rebound-side or compression-side damping force generation mechanism 50a or 50b. The piston 20 is slidable in a cylinder 10. In the piston 20, a rebound-side passage (main passage) 21a and a compression-side passage (main passage) 21b are formed so as to communicate an upper chamber 12 and a lower chamber (compression chamber) 11 of the cylinder 10. The rebound-side and compression-side damping force generation mechanisms 50a and 50b are respectively disposed above and below the piston 20 to generate at least one damping force by controlling a flow of a fluid through the rebound-side passage 21a or the compression-side passage 21b during a rebound stroke or a compression stroke of a piston rod (not illustrated) connected to the piston 20.

The rebound-side and compression-side damping force generation mechanisms 50a and 50b are arranged to be symmetrical to each other with respect to the piston 20. Since the principles are similar, only the rebound-side damping force generation mechanism 50a will be described. The rebound-side damping force generation mechanism 50a includes a main valve 400 for controlling a flow of a fluid through a main passage formed by the rebound-side passage 21a of the piston 20 and a connection passage 110a formed in a retainer 100a, and a housing 200 disposed on rear side of disk valve bodies 410, 420, and 430 of a main valve 400 and forming a pilot chamber 210 communicating with the main passage.

The main valve 400 includes the disk valve bodies 410, 420, and 430 capable of closing and opening the main passage, and a sealing member 431 for maintaining a sealing of the pilot chamber 210. The disk valve bodies 410, 420, and 430 are disposed between the retainer 100a and the housing 200. And at a lower end of the retainer 100a is formed a seat portion on which the disk valve body 410 can be seated. A concave portion 550 is formed on an outer peripheral surface of a spool guide 500. Due to this, a fluid can flow between the spool guide 500 and the disk valve bodies 410, 420, and 430 (via central through-holes of the disk valve bodies 410, 420, and 430 through which the spool guide 500 is inserted), and thus, the main passage can communicate with the pilot chamber 210.

Also, in a case where it is necessary to increase a flow rate of a fluid flowing between the main passage and the pilot chamber 210, a notch or the like may be additionally formed around the through-holes formed in the central portions of the disk valve bodies 410, 420, and 430. Furthermore, a second passage 520 may be formed in the spool guide 500 below the disk valve bodies 410, 420, and 430. The inside of the spool guide 500 may communicate with the main passage through the second passage 520 and the through-holes or notch of the disk valve bodies 410, 420, and 430.

Figure 2A:
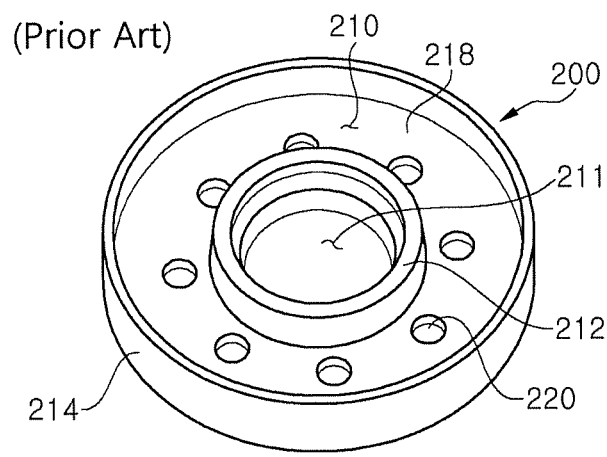
FIGS. 2A and 2B are respectively a top perspective view and a bottom perspective view of a housing constituting a pilot chamber of a conventional damping force variable shock absorber.
Figure 2B:
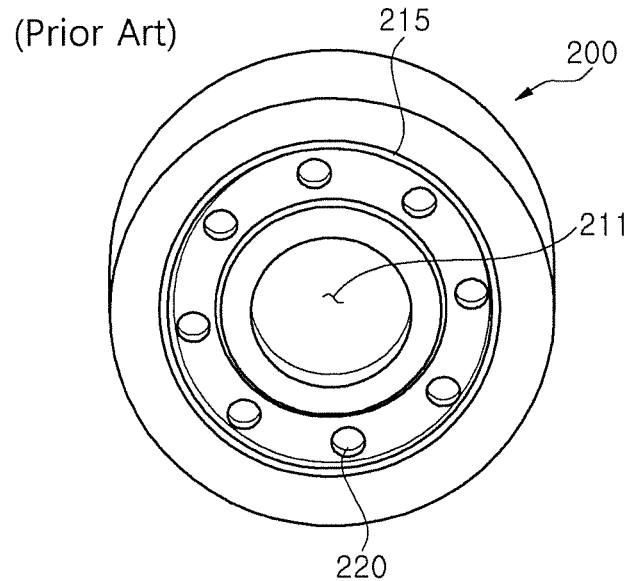

As illustrated in FIGS. 2A and 2B, the housing 200 disposed on the rear surface sides of the disk valve bodies 410, 420, and 430, that is, on the compression chamber 11 side, includes a bottom portion 218 where an insertion hole 211 through which the spool guide 500 passes is formed in a central portion, a boss portion 212 protruding along the circumference of the insertion hole 211 toward the disk valve bodies 410, 420, and 430, and a wall portion 214 protruding along an outer periphery of the bottom portion 218 toward the disk valve bodies 410, 420, and 430. In an upper portion of the boss portion 212, a notch or an orifice may be formed, such that the inside of the pilot chamber 210 formed by the bottom portion 218, the boss portion 212, and the wall portion 214 is connected to the main passage via the through-holes or notch of the disk valve bodies 410, 420, and 430. Also, a pilot hole 220 is formed in the bottom portion 218 to form a discharge passage for discharging the fluid inside the pilot chamber 210.

An annular protrusion portion 215 can be provided on a side of the housing 200 opposite to the pilot chamber 210. A pilot disk valve body 300 is disposed on this opposite side. When a pressure of the pilot chamber 210 is greater than or equal to a preset value, the disk valve body 300 is opened such that the fluid inside the pilot chamber 210 is discharged to the compression chamber 11.

According to such a configuration, three passages, that is, a first passage (main passage) P1, a second passage (hard passage) P2, and a third passage (soft passage) P3, can be formed during the rebound stroke of the piston rod. The first passage P1 is one that the fluid of the upper chamber 12 compressed by the rebound of the piston rod flows through the main passage, that is, the rebound-side passage 21a formed in the piston 20 and the connection passage 110a formed in the retainer 100a, and then, flows to the lower chamber 11 while opening the disk valve bodies 410, 420, and 430. The second passage P2 is one that after passing through the main passages 21a and 110a, the fluid moves to the pilot chamber 210 through the passage formed between the disk valve bodies 410, 420, and 430 and the spool guide 500 and the passage (for example, notch, orifice, or the like) formed in the boss portion 212 of the housing 200, and then, flows to the lower chamber 11 while opening the pilot disk valve body 300. The third passage P3 is one that after passing through the passage (the through-holes or notch of the disk valve bodies 410, 420, and 430, or the concave portion 550 of the outer surface of the spool guide 500) formed between the disk valve bodies 410, 420, and 430 and the spool guide 500, the fluid flows into the spool guide 500 through the second passage 520 formed in the spool guide 500, flows to the outside of the spool guide 500 through the first passage 510 formed in the spool guide 500, and flows into the compression-side passage 21b via a slit (not illustrated) or the like formed in the piston 20, and then, flows to the lower chamber 11.

Heretofore, the configuration of the damping force variable shock absorber as illustrated in FIGS. 1 and 2 has been described with regard to the rebound stroke, and descriptions of the other components having symmetrical structures thereto will be omitted for simplicity.

In the damping force variable shock absorber having the above-described configuration, where a stroke change, for example, a change from the rebound stroke to the compression stroke, occurs, the fluid of the lower chamber 11 can flow into the pilot chamber 210 provided in the lower chamber 11 side via the slit (not illustrated) or the like provided in the pilot disk valve body 300. However, for example, during a high-speed stroke, a great pressure difference is generated between the lower chamber 11 and the pilot chamber 210 due to a slow inflow speed, thus disadvantageously causing a great change in the damping force of the shock absorber.

Hereinafter, a damping force variable shock absorber capable of solving the aforementioned problem, according to an embodiment of the present invention, will be described with reference to FIGS. 3 and 4A to 4C. Detailed descriptions of components identical or similar to those of FIGS. 1 and 2 will be omitted for simplicity.

Figure 3:
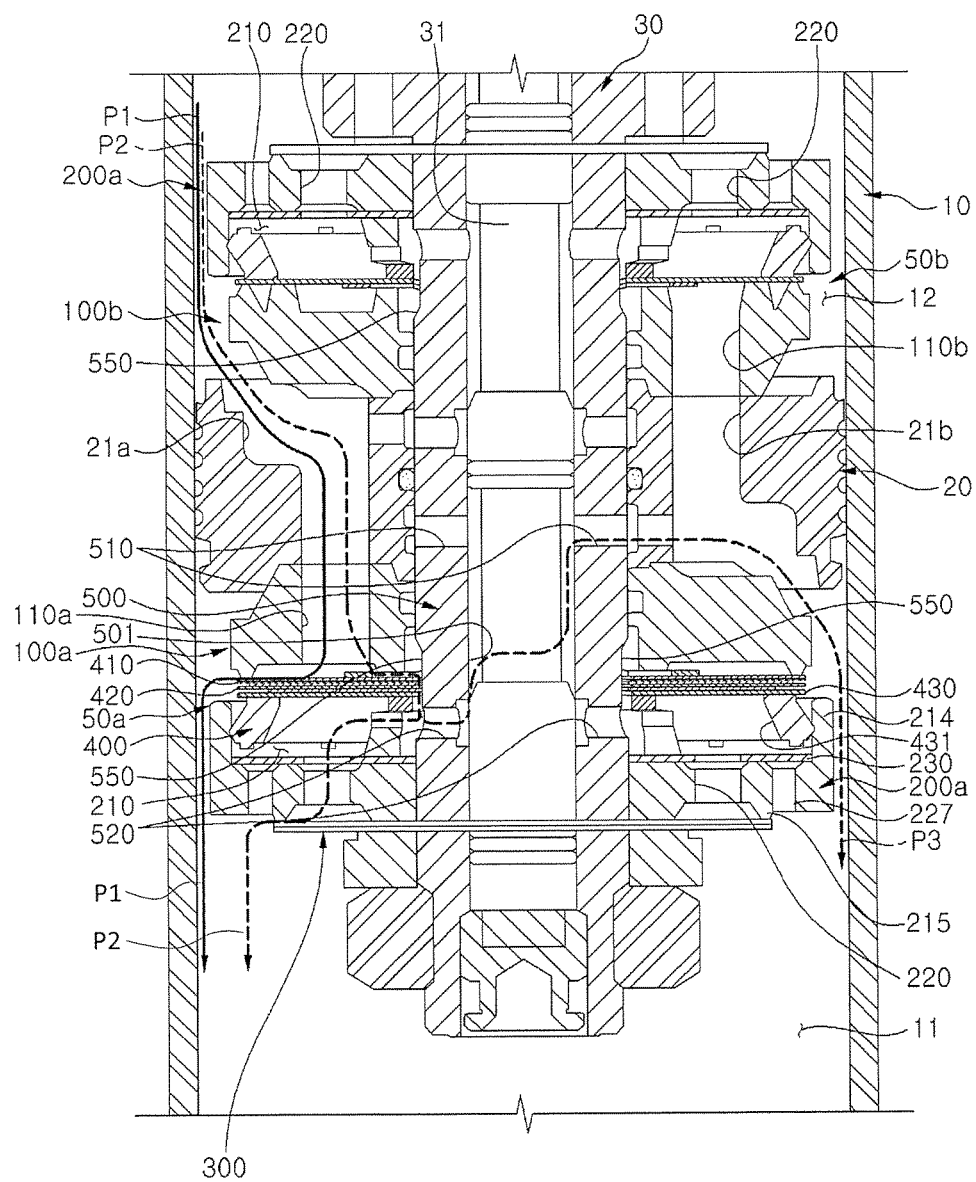
FIG. 3 is a partial sectional view of a damping force variable shock absorber according to an embodiment of the present invention.

As illustrated in FIG. 3, the damping force variable shock absorber according to the embodiment of the present invention differs from the conventional shock absorber illustrated in FIGS. 1 and 2, in that an inflow hole 227 serving as an inflow passage is further formed in a bottom portion 218 of a housing 200a forming a pilot chamber 210, and in that a check valve body, fore example a disk check valve body 230 capable of opening the inflow hole 227 in a direction in which a fluid flows into the housing 200a is disposed in the pilot chamber 210. Also, the damping force variable shock absorber according to the embodiment of the present invention may differ from the conventional shock absorber, in that the housing 200a may include a holding member (corresponding to the boss portion 212) 212a separable from the bottom portion 218 of the housing 200a.

Figure 4A:
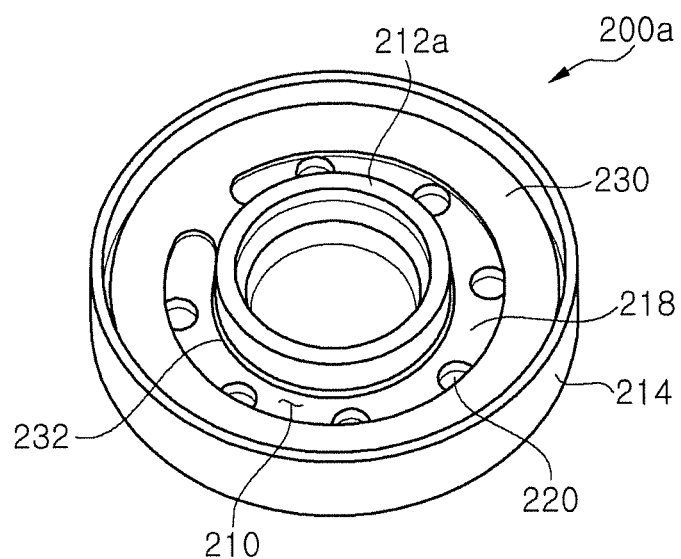
FIGS. 4A and 4B are respectively a top perspective view and a bottom perspective view of a housing constituting a pilot chamber of a damping force variable shock absorber according to an embodiment of the present invention.

Referring to FIG. 4A, the damping force variable shock absorber according to the embodiment of the present invention includes the disk check valve body 230 disposed, for example on the surface of the inner side of the bottom portion 218 inside the pilot chamber 210 formed by the housing 200a. Also, as illustrated in FIG. 4C, the disk check valve body 230 includes a valve main body 231 for opening and closing the inflow hole 227 formed in the bottom portion 218, and may include a valve holding portion 232 for holding the disk check valve body 230 in the housing 200a, and a connection portion 233 for connecting the valve main body 231 to the valve holding portion 232. In this case, a cutout portion 234 is formed between the valve main body 231 and the valve holding portion 232, and the cutout portion 234 corresponds to the pilot hole 220 formed in the bottom portion 218. Further, around the inflow hole 227 may be formed a seat on which the value main body (231) is sealed.

Figure 4B:
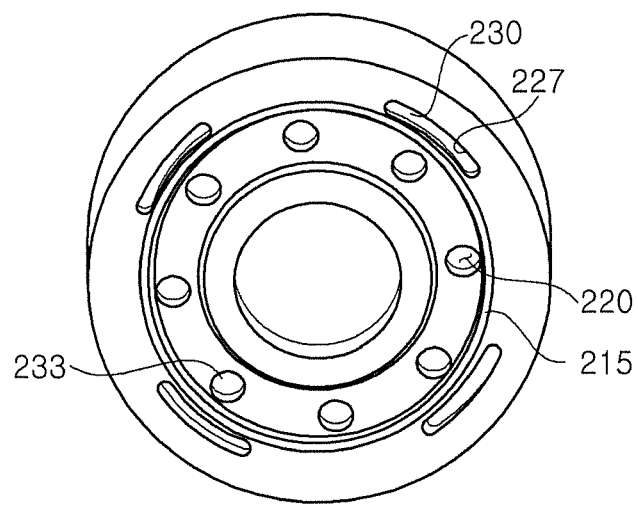
Figure 4C:
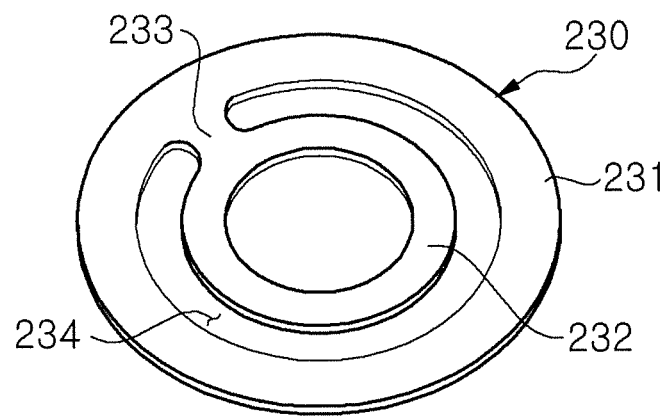
FIG. 4C is a perspective view of a disk check valve body.

As illustrated in FIG. 4B, the inflow hole 227 is disposed to be closer to an outer peripheral portion than the pilot hole 220, and may be formed to have an elongated shape by a preset length along a circumferential direction.

Also, the valve holding portion 232 is disposed between the bottom portion 218 of the housing 200a and the holding member 212a separable therefrom, and a position of the valve main body 231 may be fixed (separation type, see FIG. 4). Alternatively, in a case in which the holding member 212a is fixedly connected to the bottom portion 218, the holding portion 232 may be friction-fitted around the circumference of the ring-shaped holding member 212a (integrated type).

Also, in order to improve sealing performance of the disk check valve body 230 and achieve opening and closing performance, that is, quick restoration of the valve body from an opening position to a closing position, an elastic member, for example, a plate spring (not illustrated), may be disposed on the valve main body 231.

As described above, the damping force variable shock absorber according to the embodiment of the present invention includes the inflow hole 227 and the disk check valve body 230 in the housings 200a and 200b. Thus, upon stroke change, the fluid flowing into the housing 200a or 200b via the inflow hole 227 by the opening of the disk check valve body 230 may flow in a reverse direction of at least one of the first to third passages P1, P2 and P3 described above, thereby suppressing a great variation in the damping force due to the stroke change.

In the above description, the check valve body is of a disk type, that is disk check valve body 230, but the present invention is not limited thereto, and for example it may be a spring loaded ball type check valve. The embodiment of the present invention uses the damping force variable shock absorber employing a solenoid and a spool 31 slidable in the spool guide 500 by the solenoid, but the present invention is not limited thereto.

While the embodiments of the present invention have been described with reference to the specific embodiments, it will be apparent to those skilled in the art that various changes and modifications may be made without departing from the spirit and scope of the invention as defined in the following claims.

DESCRIPTION OF REFERENCE NUMERALS

| | |
|---|---|
| 10: cylinder | 11: lower chamber |
| 12: upper chamber | 20: piston |
| 21a: rebound-side passage | 21b: compression-side passage |
| 50a: rebound-side damping force generation mechanism | |

-continued

DESCRIPTION OF REFERENCE NUMERALS

| | |
|---|---|
| 50b: compression-side damping force generation mechanism | |
| 100a, 100b: retainer | 200, 200a: housing |
| 210: pilot chamber | 211: insertion hole |
| 212: boss portion | 212a: holding member |
| 214: wall portion | 215: protrusion portion |
| 218: bottom portion | 220: pilot hole |
| 227: inflow hole | 230: disk check valve body |
| 231: valve main body | 232: valve holding portion |
| 233: connection portion | 234: cutout portion |
| 300: pilot disk valve body | 400: main valve |
| 410; 420; 430: disk valve body | 500: spool guide |
| 510: first passage | 520: second passage |
| 550: concave portion | P1, P2, P3: first, second, and third passages |

What is claimed is:

1. A shock absorber with a pilot chamber, comprising:
a housing that constitutes the pilot chamber and includes a pilot hole and an inflow passage;
a pilot disk valve body that is disposed at an outer side of a bottom portion of the pilot hole, the pilot disk valve body being open when a pressure of the pilot chamber is greater than or equal to a preset value such that a fluid inside the pilot chamber is discharged outside via the pilot hole; and
a check valve body that allows the fluid to flow into the pilot chamber through the inflow passage,
wherein both the pilot hole and the inflow passage are formed in a bottom portion of the housing,
wherein the check valve body is disposed on an inner side of a bottom portion of the pilot chamber inside the pilot chamber, and
wherein the inflow passage comprises an inflow hole which is located at a radially outer portion than an insertion hole from a center of the housing.

2. The shock absorber according to claim 1, wherein the check valve body comprises:
a valve main body disposed in the housing so as to cover the inflow passage;
a valve holding portion connected to the housing so as to hold a position of the check valve body; and
a connection portion that connects the valve main body to the valve holding portion.

3. The shock absorber according to claim 2, wherein the housing includes a holding member, and the valve holding portion of the check valve body is disposed between the bottom surface and the holding member.

4. The shock absorber according to claim 3, wherein a cutout portion is formed between the valve main body and valve holding portion of the check valve body so as to correspond to the pilot hole.

5. The shock absorber according to claim 1, further comprising:
a spool guide inserted into the insertion hole of the housing;
a spool adapted to be slidable in the spool guide; and
a solenoid adapted to apply a force so as to move the spool,
wherein the spool guide has a first passage that communicates with at least one of the pilot chamber and a main passage for supplying a fluid to the pilot chamber.

6. The shock absorber according to claim 5, wherein when the spool opens the first passage of the spool guide, a part of a fluid flowing through the main passage flows into the spool guide through the first passage and is discharged outside from the spool guide through a second passage formed in the spool guide.

7. The shock absorber according to claim 1, wherein the inflow passage is located at a radially outer portion than the pilot hole from the center of the housing.

8. The shock absorber according to claim 2, wherein the valve main body of the check valve body is seated around the inflow passage.

9. The shock absorber according to claim 1, wherein the check valve body is of a disk type.

10. The shock absorber according to claim 1, wherein the check valve body is of a spring loaded ball type.

11. A shock absorber with a pilot chamber, comprising:
a housing that constitutes the pilot chamber and includes a pilot hole and an inflow passage;
a pilot disk valve body that is disposed at an outer side of a bottom portion of the pilot hole, the pilot disk valve body being open when a pressure of the pilot chamber is greater than or equal to a preset value such that a fluid inside the pilot chamber is discharged outside via the pilot hole; and
a check valve body that allows the fluid to flow into the pilot chamber through the inflow passage,
wherein both the pilot hole and the inflow passage are formed in a bottom portion of the housing,
wherein the check valve body is disposed on an inner side of a bottom portion of the pilot chamber inside the pilot chamber, and
wherein the inflow passage comprises an inflow hole which is located at a radially outer portion than an insertion hole and the pilot hole from a center of the housing.

* * * * *